United States Patent
Meier

(10) Patent No.: US 7,286,853 B2
(45) Date of Patent: Oct. 23, 2007

(54) SYSTEM AND METHOD FOR AGGREGATING MULTIPLE RADIO INTERFACES INTO A SINGLE LOGICAL BRIDGE INTERFACE

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 10/807,757

(22) Filed: Mar. 24, 2004

(65) Prior Publication Data

US 2005/0213547 A1   Sep. 29, 2005

(51) Int. Cl.
H04L 12/50 (2006.01)
H04L 12/28 (2006.01)
H04L 1/38 (2006.01)

(52) U.S. Cl. ................ 455/560; 370/380; 370/400; 370/401

(58) Field of Classification Search ........... 370/380, 370/400, 401
See application file for complete search history.

(56) References Cited

U.S. PATENT DOCUMENTS 6,014,406 A * 1/2000 Shida et al. ............. 375/133
6,452,910 B1 * 9/2002 Vij et al. .................. 370/310
6,807,179 B1 * 10/2004 Kanuri et al. ........ 370/395.31
6,901,275 B1 * 5/2005 Aoyagi .................... 455/574
2003/0061533 A1 * 3/2003 Perloff et al. ............... 714/9
2004/0123011 A1 * 6/2004 Murayama et al. ...... 710/305

* cited by examiner

Primary Examiner—Nick Corsaro
Assistant Examiner—Joel Ajayi
(74) Attorney, Agent, or Firm—Tucker Ellis & West, LLP

(57) ABSTRACT

A system and method for aggregating multiple radio interfaces into a single logical bridge interface with reference to an IEEE 802.11 Wi-Fi network and an Ethernet local area network. The system includes a master switch with multiple associated wireless modules. Each master switch wireless module selectively broadcasts an associated connection signal. The master switch has an associated aggregation port, which is in data communication with each of the master switch wireless modules and selectively routes data among the master switch wireless modules. The system also includes a slave switch with multiple associated wireless modules. Each of the slave switch wireless modules receives one associated connection signal and establishes a wireless data communication link with the broadcasting master switch. The slave switch also includes an associated aggregation port, which is in data communication with each of the slave switch wireless modules, selectively routes data among the slave switch wireless modules.

22 Claims, 3 Drawing Sheets

SYSTEM AND METHOD FOR AGGREGATING MULTIPLE RADIO INTERFACES INTO A SINGLE LOGICAL BRIDGE INTERFACE

BACKGROUND OF THE INVENTION

The present innovation relates generally to wireless networks and, more specifically to a protocol for aggregating multiple radio interfaces into a single logical bridge interface.

Local Area Networks (LANs) are widely used to provide interconnectivity between computers affiliated with a building or site. Typically, LAN's consist of multiple computers connected together by a hardwired network or system backbone. For example, a typical system backbone is an Ethernet or Token Ring based system. A server or host computer will also be connected to the backbone and serve as a central controller for the particular LAN. Multiple LAN segments are interconnected by devices called "bridges" or "switches".

Advances in technology have enabled LAN's to be used to interconnect wireless devices, such as laptop computers, personal data assistants and even Voice-over-Internet-Protocol telephones. In wireless networks, access points are connected to the LAN and provide for wireless interfacing of such portable wireless devices to the backbone.

Although connecting several computers or portable devices within a single building can readily be accomplished via the use of a LAN infrastructure, difficulties often arise when more than one building or site, needing connection to the infrastructure, are involved. In such cases, it may be desirable to have a single host computer or server provide all buildings or sites with interconnected services such as e-mail and group directories. In order to use a single server and enable communication between each building or site, some manner of interconnecting each LAN is needed.

One known method of interconnecting each LAN associated with a specified area is to physically make an additional hard wired connection between each LAN. Unfortunately, this method is expensive, time consuming and sometimes even not feasible. For example, a physical connection between buildings may not be possible when buildings are several miles apart or separated by natural obstacles (e.g. rivers, streams).

As a result, wireless bridges have been developed in order to provide a method of connecting two or more LANs. Bridges connect either wired or wireless networks with a physical gap between them. Wireless bridges normally offer point-to-point or point-to-multipoint connectivity for up to (approximately) 15 miles. Stated another way, a wireless bridge is a device which is physically connected to the LAN and can wirelessly transmit and receive data and other communications from other bridges connected to different LAN's. Thus, a wireless bridge allows several LAN's to become interconnected without the need for a physical connection between LANs.

In accordance with conventional wireless networks, prior implementations of network bridges support single IEEE 802.11 radio interfaces. However, because these conventional bridges operate on a single public band radio link, they are susceptible to outages due to a variety of conditions (e.g. interference). Because conventional switches correspond to a single radio link, the corresponding data rate is greatly impacted by the limitations of the single radio link.

As well, in accordance with traditional implementations, Spanning-Tree Protocol (STP) recalculation is required to activate redundant radio links. By way of background, STP is a link management protocol that provides path redundancy while preventing undesirable loops in the network. For an Ethernet network to function properly, only one active path can exist between two LAN segments. Multiple active paths between LAN segments cause loops in the network that may result in rapid frame duplication and "network storms".

To provide path redundancy, STP defines a tree data structure that spans all switches in an extended network. STP forces certain redundant data paths into a standby (blocked) state. If one network segment in the STP becomes unreachable, or if STP costs change, the spanning-tree algorithm reconfigures the spanning-tree topology and reestablishes the link by activating the standby path. STP operation is transparent to end stations, which are unaware whether they are connected to a single LAN segment or a switched LAN of multiple segments. While transparent to end stations, the STP recalculation, or reconfiguration, makes recovery from a failed conventional wireless bridge cumbersome, slow and costly. Further, traditional wireless bridge products do not leverage or utilize catalyst switch (e.g. software/firmware/ASIC) logic.

What is needed in the art is a system and method for increasing the reliability and cost effectiveness of bridging systems as applied to wireless network applications.

Further, what is needed is a system and method that uses known protocols (e.g. port aggregation protocol (PAgP)) to aggregate multiple radio interfaces into a single logical bridge interface thereby enhancing reliability and cost effectiveness.

SUMMARY OF THE INVENTION

In accordance with the present invention, there is provided a system and method for aggregating multiple radio interfaces into a single logical bridge interface.

Further in accordance with the present invention, there is provided a system for wireless bridging between networks. The system comprises one or more master switches, wherein each master switch includes an associated plurality of master switch wireless modules, each master switch wireless module including means for selectively broadcasting an associated connection signal. The system further comprises a master switch aggregation port, associated with the master switch, which is in data communication with each of the plurality of master switch wireless modules. The master switch aggregation port includes means for selectively routing data among the plurality of master switch wireless modules. The system also comprises one or more slave switches, wherein each slave switch includes an associated plurality of slave switch wireless modules. Each of the plurality of slave switch wireless modules includes means for receiving one associated connection signal and means for establishing a wireless data communication link with a master switch broadcasting the associated connection signal after receipt by the slave switch. Furthermore, the system also comprises a slave switch aggregation port associated with the slave switch. This slave switch aggregation port is in data communication with each of the plurality of slave switch wireless modules. The slave switch aggregation port includes means for selectively routing data among the plurality of slave switch wireless modules.

Still further in accordance with the present invention, there is provided a method of wireless bridging between networks. The method includes the step of selectively routing data among a plurality of master switch wireless modules, associated with a master switch, via a switch aggregation port. The method then progresses to selectively broadcasting a connection signal from each of the plurality of master switch wireless modules. Next, the method proceeds to receiving one associated connection signal into each of a plurality of slave switch wireless modules associated with a slave switch. Then, the method continues to the step of establishing at least one wireless data communication link between master switch modules broadcasting the associated connection signal and an associated one of the plurality of slave switch wireless modules after receipt of the connection signals. The method progresses further to the step of selectively routing data among the plurality of slave switch wireless modules via a slave switch aggregation port associated therewith.

In one embodiment of the present invention, the method further includes the steps of sensing a loss of at least one connection signal, and selectively redirecting data among at least one a) the master switch wireless modules and b) the slave switch wireless modules in accordance with a sensed lost connection signal.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENTS

The following includes examples of various embodiments and/or forms of components that fall within the scope of the present system that may be used for implementation. Throughout this description, the preferred embodiment and examples shown should be considered as exemplars, rather than limitations, of the present invention.

Although the embodiments of present system and method described herein are directed toward an IEEE 802.11 wireless network, it will be appreciated by one skilled in the art that the present concepts and innovations described herein are applicable to alternate wired and wireless networks and network protocols, without departing from the spirit and scope of the present innovation.

By way of background, to establish a radio link or interface, an Ethernet switch communicates with an attached Radio Module (RM) over a logical Control Link and a logical Ethernet Link. Multiple logical Ethernet links and corresponding wireless (e.g. 802.11) links are aggregated using a port aggregation protocol (e.g. PAgP) to form a single "logical bridge interface." The aggregation enables the diversion of traffic in the event that a member link (i.e. logical Ethernet link) in an aggregated bundle is-lost or fails. It will be appreciated that the link aggregation also increases the bandwidth and reliability of wireless (e.g. 802.11) bridge links. It will further be appreciated that wireless links may be separated by frequency or spatial diversity. As well, low-level point-to-point or point-to-multipoint radio links may be dynamically established in accordance with the subject protocol. In other words, multiple radio links are aggregated into a single logical bridge interface using a port aggregation protocol. For example, PAgP may be used in accordance with the present system in order to establish a single logical bridge interface. Radio links, upon establishment, are added to the aggregated bridge interface.

Radio modules (RMs) (e.g. IEEE 802.11 RMs) are attached to a wireless-enabled communications link. For exemplary purposes, the embodiments discussed herein are directed toward a Wireless-enabled Ethernet (WE) switch via an Ethernet link. Of course, alternate switches may be used with alternate LAN architectures without departing from the spirit and scope of the embodiments described herein. After connecting, Ethernet frames are bridged over an IEEE 802.11 link between an RM in a first switch and an RM in a second switch. An RM operates in "master mode" or "slave mode." Accordingly, a "master" RM may be configured to send periodic beacons while a "slave" RM scans for the beacons. This exchange prompts the communication link between the RMs.

Figure 1:
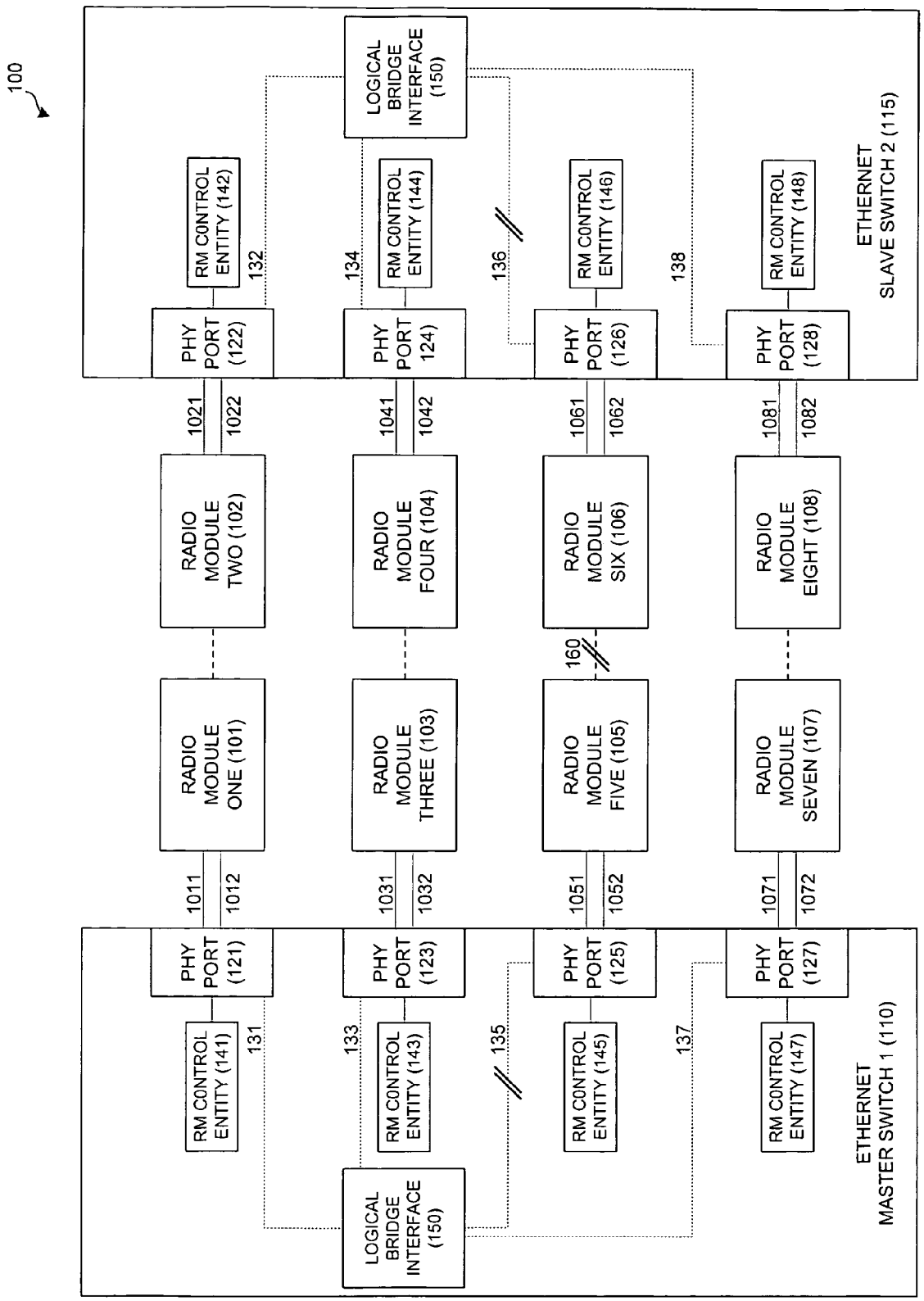
FIG. 1 illustrates a network architectural diagram that illustrates representative network components and corresponding links in accordance with a disclosed embodiment.

Turning now to FIG. 1, an exemplary architecture 100 is shown. As shown in FIG. 1, eight (8) RMs 101-108 attached to two (2) Ethernet switches 110, 115 on physical Ethernet ports 121-128 are shown. WE switches 110 and 115 are configured with Logical Control Links, shown in FIG. 1 as reference numbers 1011, 1021, 1031, 1041, 1051, 1061, 1071, and 1081, and Logical Ethernet Links, represented by reference numbers 1012, 1022, 1032, 1042, 1052, 1062, 1072, and 1082, corresponding to each RM 101-108. Each RM-specific Logical Control Link and Logical Ethernet Link are multiplexed onto a single physical Ethernet link.

It will be appreciated that messages used for RM management and link statusing are sent over the Logical Control Links 1011, 1021, 1031, 1041, 1051, 1061, 1071, and 1081. The Logical Ethernet Links 1012, 1022, 1032, 1042, 1052, 1062, 1072, and 1082 bridge Ethernet frames between RMs 101-108. It will further be appreciated to one skilled in the art that a header, pre-pended to frames sent via a physical Ethernet link is used to distinguish between control and data frames. A logical Ethernet link is represented by an internal logical Ethernet interface 131-138 within a corresponding WE switch 110 or 115. RMs are relatively simple devices in comparison to traditional 802.11 bridges. The establishment and aggregation of logical Ethernet interfaces 131-138 are enabled by bridging and forwarding logic (e.g. 802.1D, PVST, source-learning) contained within WE switches 110 and 115.

The RMs 101-108 are physically separated from the WE switches 110 and 115 via physical Ethernet links in order to improve sensitivity. It will be appreciated that the associated RMs may be desensitized if multiple RMs, in the same radio frequency (RF) band, are contained within the same switch, even if the antennas are separated. Further, an artisan will appreciate that the radio links are isolated by "spatial separation" or "frequency separation."

As illustrated in FIG. 1, each WE switch 110 and 115 contains an RM Control Entity 141-148 corresponding to each attached RM 101-108 respectively. In operation, each RM Control Entity 141-148 sends commands and receives status information over a single logical Bridge interface from its corresponding RM 101-108.

Eight (8) RMs 101-108 are attached to two (2) Ethernet switches 110 and 115 on physical Ethernet ports. In accordance with the example, a switch has a logical RM Control Link 1011, 1021, 1031, 1041, 1051, 1061, 1071, and 1081 and a Logical Ethernet Link 1012, 1022, 1032, 1042, 1052, 1062, 1072, and 1082 corresponding to each attached RM 101-108, respectively. Each Logical Ethernet Link/Control Link pair may be multiplexed onto a single physical Ethernet link as shown.

The Logical Ethernet Interfaces 131, 132, 133, 134, 135, 136, 137, and 138 corresponding to the four (4) 802.11 links from RM1 101 to RM2 102, RM3 103 to RM4 104, RM5 105 to RM6 106, and RM7 107 to RM8 108, are aggregated in Switch 1 110 and Switch 2 115 to form a single Logical Bridge Interface 150 between Switch 1110 and Switch 2115. The set of member links or Logical Ethernet Interfaces 131, 132, 133, 134, 135, 136, 137, and 138 associated with the logical bridge interface 150 are referred to as an aggregation bundle. It will be understood by those skilled in the art that any known aggregation method may be used to combine member links into an aggregation bundle. For example, it will be appreciated that aggregation protocols, such as PAgP, 802.3ad or the like, function to aggregate the member links into an aggregation bundle.

The logical bridge interface 150, comprised of an aggregation bundle, appears as a single bridge interface to the Spanning Tree Protocol (STP) in the WE switches 110 and 115. An artisan will appreciate that an STP (e.g. 802.1D protocol) is used to prevent multiple bridge links between any two LAN segments. In operation, if a Logical Bridge Interface 150 is in an STP forwarding state, the aggregation protocol (e.g. PAgP) will distribute transmit frames to established member links. It will be appreciated that the PAgP hashes the MAC addresses of a transmit frame to determine the appropriate output member link.

Therefore, in accordance with the present system and method, all traffic corresponding to a single traffic stream may be directed to a common member link. Further, in the event that a single member link (e.g. 135) goes down or fails, traffic is immediately diverted to other alternate member links (e.g. 131, 133). The redirection of traffic in the event of a link failure is discussed in more detail below with reference to FIG. 2.

Figure 2:
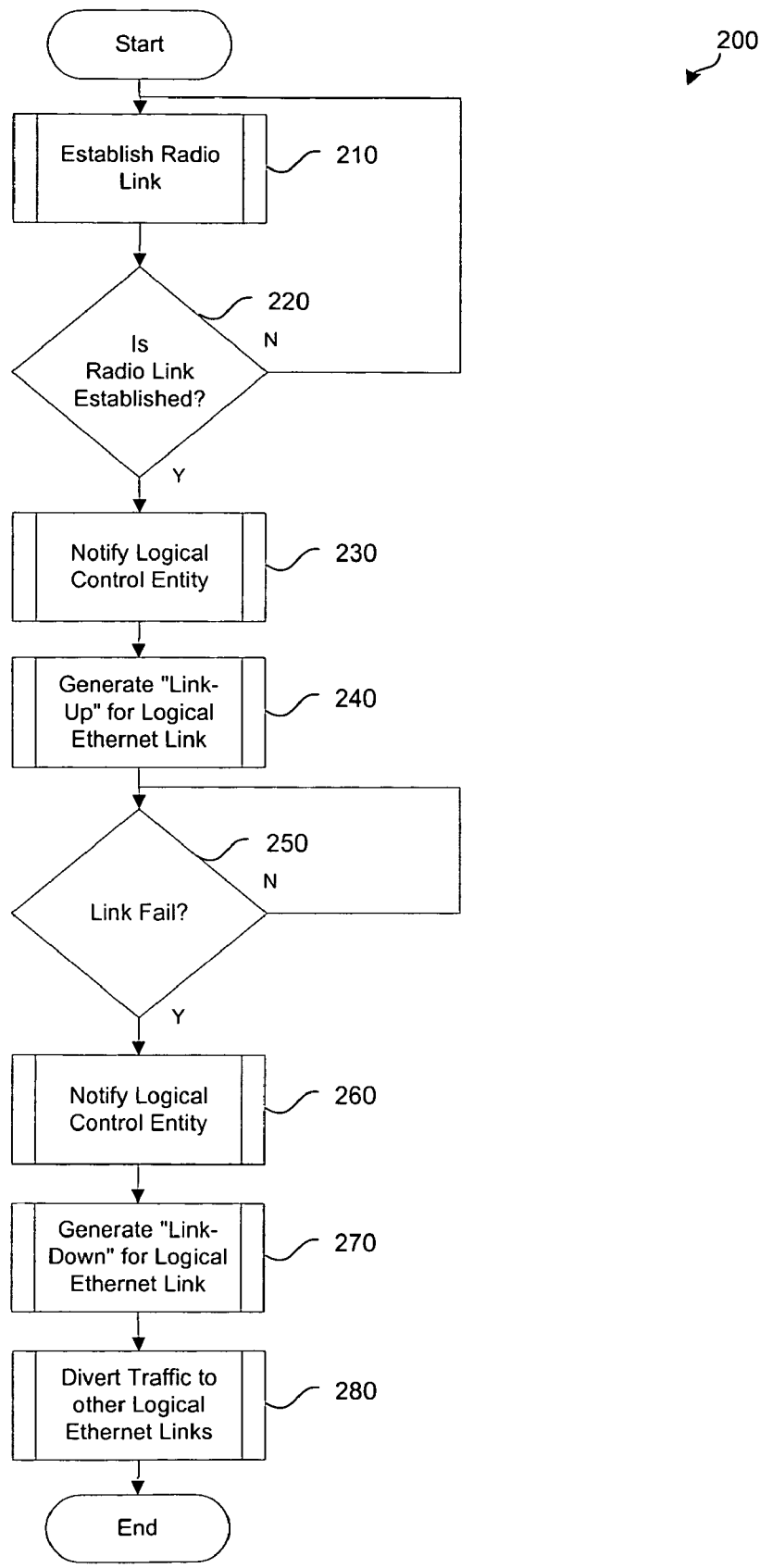
FIG. 2 illustrates a flow chart of the methodology outlining the process steps to generate and establish "link-up" and/or "link-down" events in accordance with a disclosed embodiment.

Now with reference to FIG. 1 and FIG. 2 together, the RMs 101-108 provide link status information to their corresponding RM Control Entity 141-148. Accordingly, the RM Control Entities 141-148 generate the "link up" or "link down" events described below. It will be appreciated that the designations "link up" and "link down" are provided for discussion purposes only and are intended to describe physical and/or logical connection states of the RMs.

Referring now to FIG. 2, there is illustrated a flow chart of an embodiment of the methodology 200 for generating and establishing "link up" and/or "link down" RM events. Initially, at step 210, the system establishes a radio link in accordance with the applicable protocols and standards described above and those known in the art (e.g. IEEE 802.11). Next, the system determines at step 220 if a valid radio link is established. Upon a determination at step 220 that a valid radio link has not been established, the system returns to step 210 and again attempts to establish the radio link.

When the system determines at step 220 that a valid radio link has been established, the system notifies the corresponding RM Control Entity at step 230. For example, an RM 105 in a first switch 110 notifies the corresponding RM Control Entity 145 when a radio link is established to a peer RM 106 in a second switch 115. Upon receiving notification, the RM Control Entity generates a "link up" event for the respective Logical Ethernet Link at step 240. After receiving notification from the RM 105, the Control Entity 145 generates a "link up" event for the respective Logical Ethernet Link 135 to be linked up into the Logical Bridge Interface 150.

Next, the system determines whether or not the link has failed at step 250. When the link remains functional, as determined at step 250, the system remains idle in the "linked up" state and continues to query as shown. On the other hand, if at step 250, a determination is made that the link has failed, the corresponding Control Entity will be notified of the failure at step 260. Therefore the RM 105 notifies the corresponding Control Entity 145 in the WE switch 110 that the radio link 160 to the peer RM 106 has failed.

When such a failure has occurred, the system generates a "link down" event to disconnect the Logical Ethernet Link at step 270. In other words, the RM Control Entity 145 generates a "link down" event for the respective Logical Ethernet Link 135 to prompt the switch to immediately deactivate the corresponding WE switch port 125 thereby diverting traffic to an alternate member link or port 121 or 123, in the aggregation bundle, as shown at step 280. Thereafter, RM5 105 and RM6 106 notify their respective RM Control Entities 145 and 146 in Switch 1110 and Switch 2115 that the 802.11 link 160 from RM5 105 to RM6 106 has failed. In response, the respective Logical Ethernet Links 135 and 136 are deactivated in Switch 1 and Switch 2.

Next, in the event that a logical bridge interface in one WE switch is blocked by the STP, the corresponding logical bridge interface in the peer WE switch must also be blocked. In operation, if Logical Bridge Interface 150 of WE switch 115 is blocked by the STP, a control message is sent over the logical bridge interface to notify the WE switch 110 that the remote end of the logical link is in a "blocked" STP state. It will be appreciated by those skilled in the art that the STP cannot block individual member links in the aggregation bundled. The STP puts the entire logical interface 150 of WE switch 115 into a "blocked" or "forwarding" state.

In an alternate embodiment of the present system and method, the system determines the available bandwidth on the 802.11 member link which varies significantly due to sporadic interference and channel contention. In such cases, an RM Control Entity forwards flow control information to the respective PAgP entity in the WE switch to prompt the redistribution of traffic to bundle member links in proportion to the available 802.11 bandwidth on each link. It will be appreciated that wireless protocol and standards (e.g. 802.3ad) defines a marking protocol that is used to avoid reordering of frames when traffic is diverted.

Figure 3:
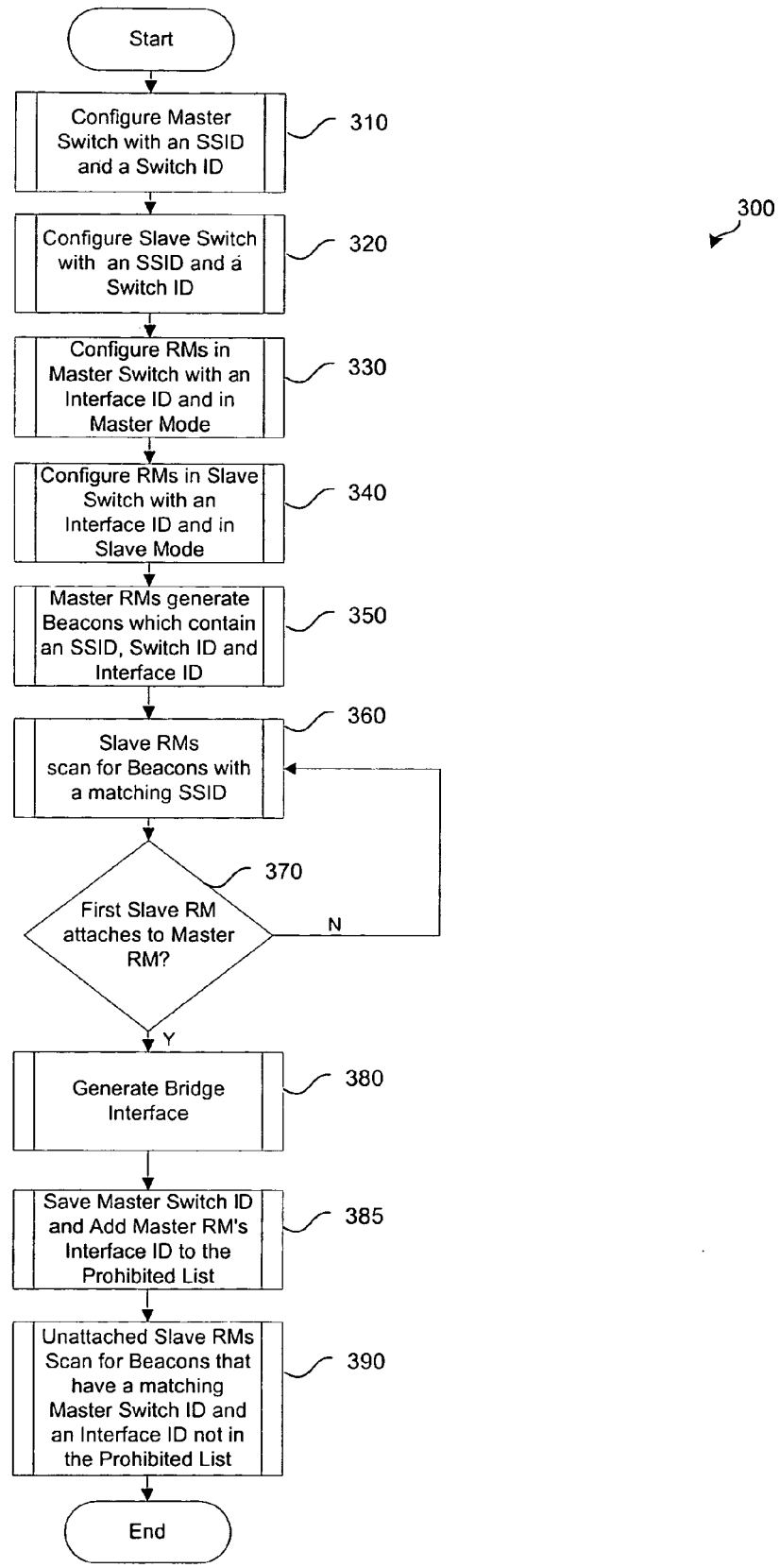
FIG. 3 illustrates a flow chart of the methodology outlining the process steps to establish and remove inter-switch point-to-point and/or point-to-multipoint links in accordance with a disclosed embodiment.

Now with reference to FIG. 3, the system is configured to establish inter-switch point-to-point and/or point-to-multi-point RM links. Referring now to FIG. 3, there is illustrated a flow chart of an embodiment of the methodology 300 for establishing inter-switch point-to-point and/or point-to-multipoint links. Initially, at step 310, a "master" switch is configured with a master switch identification (ID) and a service set identifier (SSID). It will be appreciated that a master switch is a switch that is in communication with the primary backbone network. Accordingly, at step 320, a "slave" switch is configured with a slave switch ID and SSID.

It will be appreciated that the set of master and slave RMs that form a single, logical bridge link must be contained in a single master switch and a single slave switch, respectively, to avoid inter-switch link statusing. To support point-to-multipoint links, a single master RM supports wireless links to multiple slave RMs; however, each slave RM must be in a different slave switch. Stated differently, two or more RMs in the same slave switch cannot establish a link with the same RM module in a master switch.

After configuring the SSID of the master and slave switches, the system proceeds to classify the associated RMs as either masters or slaves. As shown in FIG. 3, the RMs associated with the master switch are classified as "master" RMs at step 330, and the RMs associated with the slave switch are classified as "slave" RMs at step 340. Therefore, at block 330, the RMs on a master switch are configured in master mode thereby designating the RMs as master RMs. Likewise, RMs on a slave switch are configured in slave mode thereby designating the RMs as slave RMs at step 340. It will be appreciated that each RM is configured with an RM Interface ID to uniquely identify the RM.

In other words, a master RM may only establish a radio link with a slave RM which has a matching SSID. In the preferred embodiment, the SSID is a standard 802.11 SSID, the Switch ID is an 802.1D Bridge Address and the RM Interface ID is an 802.11 BSSID. Of course, any preferred identifiers may be used in accordance with the present system and method without departing from the spirit and scope of the subject invention.

Following configuration of the master RMs and slave RMs, at step 350 each master RM generates periodic beacons which contain the SSID, the master Switch ID and the RM Interface ID. An artisan will appreciate that the master RM transmits beacons on a single radio channel. It should be noted that a set of master RMs in switches that are wired to the primary backbone network must advertise availability to slave RMs attached to secondary Ethernet LANs. This advertising is accomplished via generation and transmission of the beacons at step 350. The beacons include the Switch ID and SSID, configured for the respective master switch, and the RM Interface ID configured for the respective RM.

In order to effectuate the linking of RMs, at step 360 an unattached slave RM scans available radio channels for the beacons sent by master RMs. Specifically, an unattached or unbound slave RM, attached to a slave switch, scans for beacons from a master RM, in a master switch having a matching SSID, which is not currently bound to a different slave RM in the same switch. Upon detecting a master beacon, the slave determines at step 370 if the master RM has a pre-established link to a slave in the same switch as the subject slave switch.

When the selected master RM has a pre-established link to a slave in the same switch as determined at step 370, the system returns the slave to scan for additional master beacons as shown at step 360. When a pre-established link is not present, as determined at step 370, the master and slave dynamically link forming a Bridge Interface at step 380. In other words, an unbound slave RM will select a master RM if the master RM has a matching SSID and the master RM has not yet established a link to another slave RM in the same slave switch. It will be appreciated by those skilled in the art that the SSIDs and other identifiers of the respective master and slave RMs are compared for compatibility. The slave RM reports its slave Switch ID and Interface ID in an association or re-association message sent to the master RM to establish a wireless link.

After a first slave RM, in a slave switch, has established a link with a first master RM, in a master switch as shown at step 380, other slave RMs in the same slave switch must establish links with other master RMs in the same master switch, to avoid operating the port aggregation protocol across multiple switches. As each RM-to-RM link is established, the RM Interface ID of the respective master RM is added to a set of prohibited Interfaces IDs at step 385. A slave RM cannot establish a link with a master RM, if the master RM's Interface ID is in the set of prohibited Interface IDs. Therefore, after a first slave RM has established a link with a first master RM, other slave RMs, in the same slave switch, only scan for master RMs that have the same Switch ID as the first RM as shown at step 390.

At this point, a Bridge Interface is created for each master/slave pair both in the master switch and in the slave switch. Upon the establishment of a master/slave radio link as described with respect to FIG. 2, the corresponding logical Ethernet interface is added to the aggregated Bridge Interface for the master/slave switch pair as previously described.

As described, an aggregation bridge interface includes a set of master RM to slave RM links whereby all master RMs are in a single master switch and all peer slave RMs are in a single slave switch.

In alternate embodiments, a single master RM is linked to multiple slave RMs so long as the multiple slave RMs are located in distinct slave switches. Thus, a logical Ethernet interface is associated in the master switch corresponding to each of the master RM's links to a slave RM.

An artisan will appreciate that a low-level protocol is used to establish an "optimal" logical master/slave switch logical bridge link. For example, a slave switch contains RMs configured to connect with master RMs in multiple master switches. The "optimal" logical bridge link is the aggregated link with the lowest "cost." It will be appreciated that the cost of an aggregated logical bridge link decreases as RM-to-RM links are added or as the bandwidth of existing RM-to-RM links increases. Further, the cost increases if RM-to-RM links are lost of if bandwidth is lost. Accordingly, in order to optimize link costs, the slave RMs in a single slave switch will advantageously select master RMs, which reduces the aggregate link cost. Sporadic changes in aggregated link cost are hidden from the higher-level STP in order to avoid frequent STP topology changes.

A master switch, with a point-to-multipoint link to multiple slave switches, must distribute a copy of a frame to each slave switch if the frame has a multicast destination address or an "unknown" unicast destination address. A master switch may send a separate copy to each slave switch or it may multicast a single copy to multiple slave switches. A master switch may use a "reliable multicast transmission protocol" to reliably deliver multicast frames to multiple slave switches.

While the present system has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the applicant's general inventive concept. Although the preferred embodiment has been described in detail, it should be understood that various changes, substitutions and alterations can be made therein without departing from the spirit and scope of the invention as defined by the appended claims.

What is claimed is:

1. A system for wireless bridging between networks comprising:
   a master switch, the master switch including first and second master switch wireless modules, the first master switch wireless module including means for selectively broadcasting a first associated connection signal and the second master switch wireless module including means for selectively broadcasting a second associated connection signal;
   a master switch aggregation port associated with the master switch, the master switch aggregation port being in data communication with each of the first and second master switch wireless modules, the master switch aggregation port including means for selectively routing data among the first and second master switch wireless modules;
   a slave switch, the slave switch including an associated first and second slave switch wireless modules, the first slave switch wireless module including means for receiving the first associated connection signal and means for establishing a first wireless data communication link with the first master switch broadcasting the first associated connection signal after receipt thereof, the second slave switch wireless module including means for receiving the second associated connection signal and means for establishing a second wireless data communication link with the second master switch broadcasting the second associated connection signal after receipt thereof; and
   a slave switch aggregation port associated with the slave switch, the slave switch aggregation port being in data communication with each of the first and second slave switch wireless modules, the slave switch aggregation port including means for selectively routing data among the first and slave switch wireless modules;
   wherein the first wireless data communication link and the second wireless data communications link operate concurrently.

2. The system for wireless bridging between networks of claim 1, wherein each aggregation port includes means for detecting a loss of at least one of the first connection signal and the second connection signal, and wherein the means for selectively redirecting is activated in accordance with an output thereof.

3. The system for wireless bridging between networks of claim 2 further comprising means for balancing data flow among at least one of the first and second of master wireless switch modules.

4. The system for wireless bridging between networks of claim 2 further comprising means for balancing data flow among at least one of the first and second slave wireless switch modules.

5. The system for wireless bridging of claim 1 wherein each of the first and second master wireless modules and first and second slave wireless modules includes means for transmitting data via radio frequency transmission.

6. The system for wireless bridging of claim 5 wherein the aggregation ports operate in connection with a selected port aggregation protocol.

7. The system for wireless bridging of claim 6 wherein the port aggregation protocol is at least one of a Cisco Port Aggregation Protocol and an IEEE 802.1ad port aggregation protocol.

8. A system according to claim 1, wherein the first wireless data communication link and second wireless data communication link are isolated by spatial separation.

9. A system according to claim 1, wherein the first wireless data communication link and second wireless data communication link are isolated by frequency separation.

10. A method of wireless bridging between networks comprising the steps of:
    selectively routing data among a first and second master switch wireless modules, associated with a master switch, via a switch aggregation port associated therewith;
    selectively broadcasting a first connection signal from the first master switch wireless module;
    selectively broadcasting a second connection signal from the second master switch wireless module;
    receiving the first connection signal and the second connection signal by a first slave switch wireless module associated with a slave switch;
    selecting the first connection signal for establishing a first wireless data communication link between the first master switch wireless module broadcasting the first connection signal and the first slave switch wireless module after receipt of the connection signals;
    adding data representative of the first master switch wireless module to a prohibited list responsive to establishing the first wireless data communication link;
    receiving the first connection signal and the second connection signal by a second slave switch wireless module associated with the slave switch;
    selecting the second connection signal by the second slave switch wireless module responsive to determining the first master switch wireless module is bound to the first slave switch wireless module; and
    selectively routing data among the first and second wireless communication links via a slave switch aggregation port associated therewith.

11. The method of wireless bridging between networks of claim 10 further comprising the steps of:
    sensing a loss of at least one connection signal; and
    selectively redirecting data among at least one a) the first and second master switch wireless modules and b) the first and second slave switch wireless modules in accordance with a sensed lost connection signal.

12. The method of wireless bridging between networks of claim 11 further comprising the step of balancing data flow among at least one of a) the first and second master wireless switch modules and b) first and second slave wireless modules.

13. The method of wireless bridging of claim 10 further comprising the step of transmitting data via radio frequency transmission on each of the first and second wireless data communication links.

14. The method of wireless bridging of claim 13 further comprising the step of controlling the aggregation ports operate in connection with a selected port aggregation protocol.

15. The method of wireless bridging of claim 14 wherein the port aggregation protocol is at least one of a Cisco Port Aggregation Protocol and an IEEE 802.1ad port aggregation protocol.

16. The method of wireless bridging of claim 13 further comprising the steps of:

establishing a weighting value associated with alternative data communication paths between a selected master wireless module and first and second slave switch wireless modules; and selectively establishing a wireless data communication links between the selected master wireless module and a selected slave switch wireless module of the first and second slave switch wireless modules thereof, which selection is made accordance with the weighting value.

17. The method of claim 13 wherein the connection signal further comprises a beacon signal, wherein the beacon signal includes a service set identifier identifying at least one of the plurality of master wireless modules having a service set identifier matching a service set identifier of at least one of the plurality of slave wireless modules.

18. The method of claim 17, wherein the service set identifier is an IEEE 802.11 Service Set Identifier and the beacon is at least one of an 802.11 Beacon and an 802.11 Probe Response.

19. The method of claim 13, wherein the master switch includes a switch identifier, the switch identifier transmitted by at least one the plurality of master switch wireless modules.

20. The method of claim 19, wherein at least one of the slave switch wireless modules of the slave switch are connected to at least one of the master switch wireless modules of the master switch and unconnected master switch wireless modules of the master switch transmit a beacon identifying the master switch to the unconnected slave switch wireless modules of the slave switch.

21. The method of claim 20, wherein the beacon is at least one of an IEEE 802.11 Beacon and an IEEE 802.11 Probe Response.

22. The method of claim 10, further comprising the step of transmitting from the master switch to a plurality of slave switches a single copy of a multicast frame using a selected multicast transmission protocol.

* * * * *